(12) United States Patent
Ma et al.

(10) Patent No.: US 6,584,049 B1
(45) Date of Patent: Jun. 24, 2003

(54) DEVICE FOR REDUCING CROSS TALK IN SIGNAL DETECTING APPARATUS USED IN AN OPTICAL PICKUP DEVICE

(75) Inventors: Byung-in Ma, Suwon (KR); In-sik Park, Suwon (KR); Joong-eon Seo, Uiwang (KR); Chong-sam Chung, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 186 days.

(21) Appl. No.: 09/698,048

(22) Filed: Oct. 30, 2000

(30) Foreign Application Priority Data

Oct. 30, 1999 (KR) .......................................... 1999-47750

(51) Int. Cl.$^7$ ................................................. G11B 7/00

(52) U.S. Cl. .................................. 369/44.41; 369/44.42

(58) Field of Search ........................... 369/44.41, 44.42, 369/53.28, 124.12

(56) References Cited

U.S. PATENT DOCUMENTS 5,617,389 A * 4/1997 Satoh et al. ............. 369/44.41

* cited by examiner

Primary Examiner—Nabil Hindi
(74) Attorney, Agent, or Firm—Staas & Halsey LLP

(57) ABSTRACT

A tracking error signal detecting apparatus with improvement in offset due to gain characteristics and/or a difference in the depth between pits by providing an improved sectioning structure of an eight-sectional photodetector having inner and outer sectional plates, the radial widths of which vary along the tangential direction from the center of the photodetector, and a reproduction signal detecting apparatus with reduced crosstalk noise. The tracking error signal detecting apparatus can allow accurate tracking control in a high-density recording medium having relatively narrow tracks. Also, the reproduction signal detecting apparatus can correct signal distortion due to a difference between phase characteristics of detection signals of inner and outer sectional plates of a photodetector even during reproduction of an information signal from a high-density recording medium having relatively narrow tracks, thereby detecting an improved reproduction signal with greatly reduced crosstalk.

28 Claims, 13 Drawing Sheets

DEVICE FOR REDUCING CROSS TALK IN SIGNAL DETECTING APPARATUS USED IN AN OPTICAL PICKUP DEVICE

CROSS-REFERENCE TO RELATED APPLICATIONS

This application claims the benefit of Korean Application No. 1999-47750, filed Oct. 30, 1999, in the Korean Industrial Property Office, the disclosure of which is incorporated herein by reference.

BACKGROUND OF THE INVENTION

1. Field of the Invention

The present invention relates to a device in a signal detecting apparatus that reduces cross talk, and more particularly, to a signal detecting apparatus for improving the precision in detecting a tracking error signal and/or a reproduction signal with crosstalk noise greatly reduced.

2. Description of the Related Art

A conventional method for detecting a tracking error signal (TES) is by differential phase detection (DPD). DPD involves detecting tracking errors by receiving light radiated from a light source of an optical pickup device and reflected from a disk.

Referring to FIG. 1, light radiated onto a ROM-type disk is reflected and diffracted into 0th-order maximum and ±1st-order maxima by recording marks such as pits (P). After traveling back to the optical pickup, the light received at a photodetector 1 substantially consists of the 0th-order maximum overlapped by ±1st-order maxima in a radial direction. As shown, for a high-density disk having narrow tracks, such as a next-generation digital versatile disk (DVD) like an HD-DVD, the 0th-order maximum and ±1st-order maxima overlap, while the +1st-order maximum and −1st-order maximum do not overlap each other.

The phase signals for the portions where the 0th-order maximum overlaps with the +1st-order maximum and the −1st-order maximum have different features than the phase signal of the portion that only receives the 0th-order maximum. Thus, a high-density disk having narrow tracks, if a tracking error signal is detected by a general DPD method in which detection signals of diagonal sectional plates A/C and B/D are simply subtracted, there is a lot of noise in the tracking error signal due to crosstalk between adjacent tracks. In order to detect a tracking error signal with reduced crosstalk noise from adjacent tracks, there has been proposed a method in which an 8-sectional photodetector 20 is used to reduce the cross talk using the device shown in FIG. 2.

As shown in FIG. 2, the 8-sectional photodetector 20 is divided into 4 parts the 4 parts are along a row in the radial direction of a disc. Each part is further divided into 2 parts in the tangential direction of a disk to create a 2×4 matrix. As shown, the respective 2-sectional plates A1/A2, B1/B2, C1/C2 and D1/D2 correspond to the sectional plates A, B, C and D of the photodetector 21 shown in FIG. 1. The sectional plates A2, B2, C2 and D2 are located tangentially inward to A1, B1, C1 and D1, respectively.

The tracking error signal is produced from the detection signals from the 8-sectional photodetector 20 as follows.

Referring to FIG. 3, detection signals a1 and c1 of outer sectional plates A1 and C1 are summed to produce a sum signal (a1+c1). In addition, detection signals a2 and c2 of inner sectional plates A2 and C2 are summed and amplified with a predetermined gain k1 to form amplified summed signal k1(a2+c2). These results are summed to produce the sum signal (a1+c1+k1(a2+c2)), which is amplified by a predetermined gain k2 using amplifier 21.

Likewise, a sum signal (b1+d1) of detection signals b1 and d1 of outer sectional plates B1 and D1 and a signal obtained by amplifying a sum signal (b2+d2) of detection signals b2 and d2 of inner sectional plates B2 and D2 with a predetermined gain k are summed. Then, the signal (k2 (a1+c1+k1(a2+c2))) output from the amplifier 21 and the operation signal (b+d1+k(b2+d2)) output from the diagonal sectional plates B1, B2, D1 and D2 are applied to a phase comparator 25 for comparison of phases, to then generate a tracking error signal TES.

As shown, if k=k1=0 and k2=1, the signals applied to the phase comparator 25 are a1+c1 and b1+d1, which corresponds to the case where a phase difference is obtained using a sum signal of detection signals of outer sectional plates arranged in a diagonal direction. Also, if k≠0 and k1≠0, the signals applied to the phase comparator 25 are a2+c2 and b2+d2, which correspond to the case where a phase difference is obtained using a sum signal of detection signals of inner sectional plates arranged in a diagonal direction.

According to the aforementioned tracking error signal detecting apparatus, since a phase difference is obtained by selectively amplifying the detection signals of inner sectional plates A2, B2, C2 and D2 with predetermined gain factors, and then adding the amplified signals and detection signals of outer sectional plates A1, B1, C1 and D1, a tracking error signal with reduced crosstalk noise can be generated.

Although the conventional tracking error signal detecting apparatus reduces crosstalk noise to a degree, when it is used with a high-density disk having narrow tracks, since the tangential phase characteristics are obscured, the gain of the tracking error signals is very low. Thus, the precision is poor. Basically, the light beams received at the sectional plates positioned at different locations in a tangential direction of a track have different phase characteristics at a starting area and an ending area of a recording mark such as a pit. However, if the detection signals of diagonally adjacent plates are summed as in the conventional tracking error signal detecting apparatus, the tangential phase characteristics are offset, which results in tracking error signals having a low gain and poor precision.

Also, in the conventional tracking error signal detecting apparatus, since the sum signals of detection signals of diagonally adjacent sectional plates are used, a phase difference between the sum signals is offset due to a difference in the depth between pits. Thus, if an objective lens (not shown) is shifted, a large offset may occur to the tracking error signals.

SUMMARY OF THE INVENTION

The present invention has been made in view of the points described above, and it is an object of the present invention to provide a signal detecting apparatus with improvement in gain characteristics and/or offset for reduced crosstalk noise.

It is a further object of the present invention to provide a tracking error signal detecting apparatus with improvement in gain characteristics and/or offset due to a difference in the depth between pits by providing an improved sectioning structure of an 8-sectional photodetector with reduced crosstalk noise.

It is a still further object of the present invention to provide a reproduction signal detecting apparatus with improvement in gain characteristics and/or offset due to a difference in the depth between pits by providing an improved sectioning structure of an 8-sectional photodetector with reduced crosstalk noise.

Additional objects and advantages of the invention will be set forth in part in the description which follows and, in part, will be obvious from the description, or may be learned by practice of the invention.

To achieve the above object, there is provided a tracking error signal detecting apparatus including a photodetector which receives light reflected/diffracted from a recording medium, and a circuit unit which performs operations on detection signals of the photodetector and produces a tracking error signal, wherein the photodetector includes four light receiving regions arrayed counterclockwise, the dividing lines of which are substantially parallel to the radial and tangential directions of the recording medium, each of the four light receiving regions are further bisected to produce an inner sectional plate and an outer sectional plate, the radial widths of which vary along ± tangential directions from the center of the photodetector, so that 8 inner and outer sectional plates arrayed in a 2×4 matrix are formed, the directions of columns and rows of the sectional plates corresponding to the radial and tangential directions of the recording medium, and wherein the circuit unit compares the phases of the light receiving regions positioned in the same row and then produces a tracking error signal from a phase difference signal.

According to another aspect of the present invention, the circuit unit amplifies at least some of the detection signals of the inner and/or outer sectional plates positioned in one diagonal direction with a predetermined gain, compares phase differences between the amplified signals and at least some of the detection signals of inner and/or outer sectional plates positioned in the other diagonal direction, and detects a tracking error signal from a phase difference signal.

According to another aspect of the present invention, the inner sectional plates are formed such that their widths are relatively narrower at the center of the photodetector and relatively wider along ± tangential directions.

According to another aspect of the present invention, the lines dividing the inner light receiving regions from the outer sectional plates are preferably curved lines, and the maximum width of each of the inner sectional plates is preferably larger than the radius of received 0th-order maximum.

According to another aspect of the present invention, a reproduction signal detecting apparatus for accomplishing the above and other objects of the present invention may include a photodetector which receives light reflected/diffracted from a recording medium, and a circuit unit which performs operations on detection signals of the photodetector and produces a reproduction signal, wherein the photodetector includes four light receiving regions arrayed counterclockwise, the dividing lines of which are substantially parallel to the radial and tangential directions of the recording medium, each of the four light receiving regions are further bisected to produce an inner sectional plate and an outer sectional plate, the radial widths of which vary along ± tangential directions from the center of the photodetector, so that 8 inner and outer sectional plates arrayed in a 2×4 matrix are formed, the directions of columns and rows of the sectional plates corresponding to the radial and tangential directions of the recording medium, and wherein the circuit unit includes an amplifier for amplifying a sum signal of detection signals of the outer sectional plates, and an adder for adding a sum signal of detection signals of the inner sectional plates and the output signal of the amplifier.

According to another aspect of the present invention, the circuit unit may further include a time delay for time-delaying detection signals of the inner and/or outer sectional plates positioned in one row.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENTS

Figure 1:
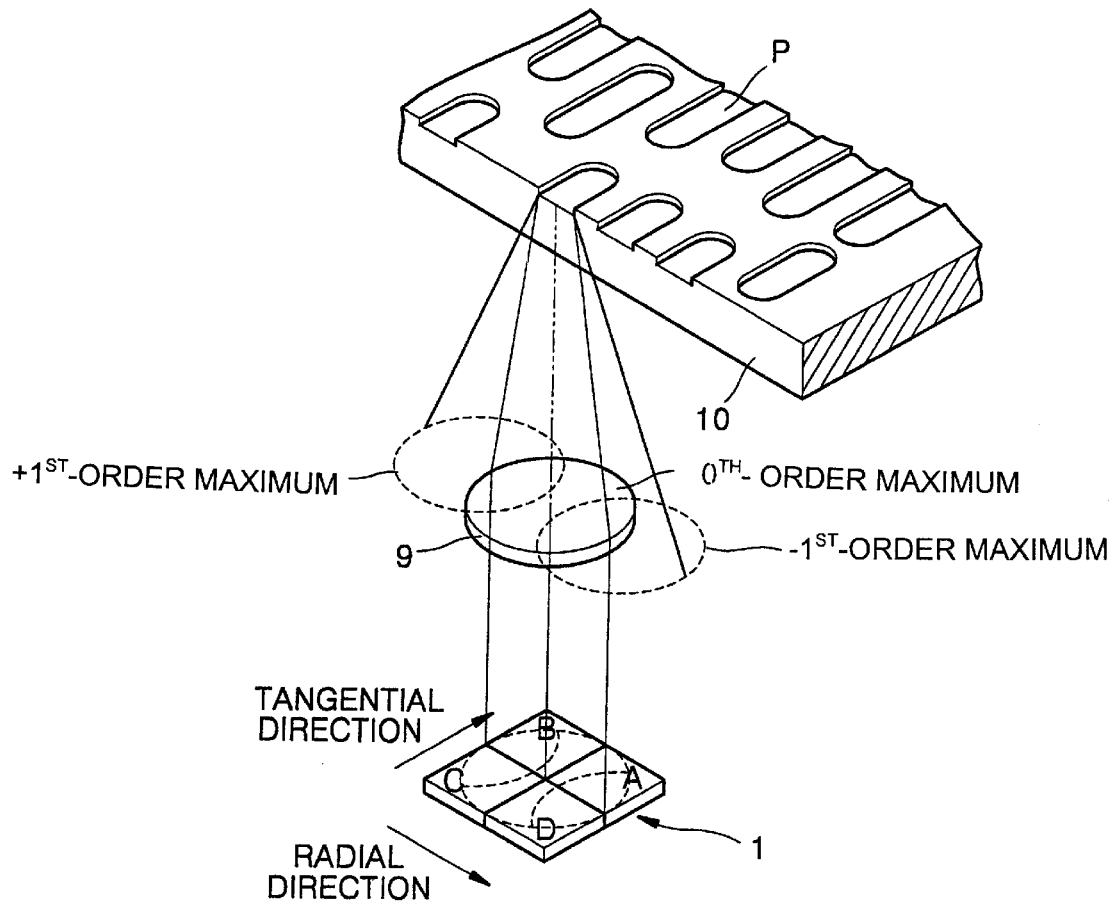
FIG. 1 is a perspective view illustrating the light reflected/diffracted from a general recording medium.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 4:
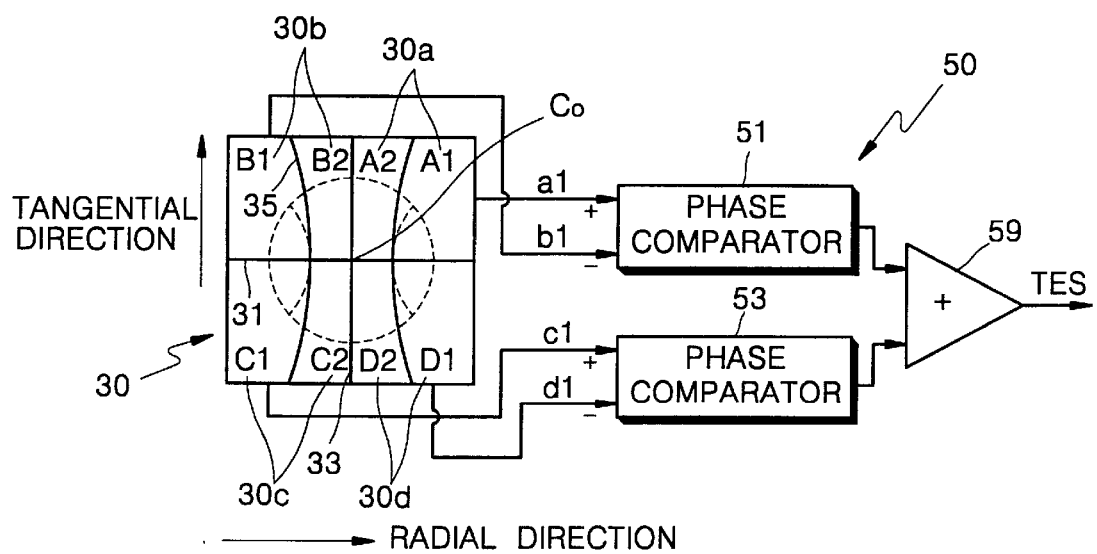
FIG. 4 is a diagram schematically illustrating a tracking error signal detecting apparatus according to an embodiment of the present invention.

Referring to FIG. 4, a tracking error signal detecting apparatus according to an embodiment of the present invention includes a photodetector 30 for receiving the light reflected/diffracted from a recording medium such as a disk 10 (not shown), and a circuit unit 50 for performing operations with respect to the detection signals from the photodetector 30 to produce a tracking error signal TES. As shown, the photodetector 30 receives incident light reflected from the disk 10, and the detection signals thereof are used both in detecting the tracking error signal TES, and a reproduction signal from of the disk 10.

The photodetector 30 includes four light receiving regions 30a (A1/A2), 30b (B1/B2), 30c (C1/C2) and 30d (D1/D2) arrayed counterclockwise in a 2×2 matrix. The light receiving regions are arranged so that the photodetector 30 is bisected in the tangential direction by line 31, and in the radial direction by line 33. The tangential direction refers to a direction of information sequences recorded on the disk 10, and the radial direction refers to a direction perpendicular to the information sequences (pits) on the disk 10. The respective light receiving regions 30a, 30b, 30c and 30d are bisected by line 35 to have inner sectional plates A2, B2, C2 and D2, the radial widths of which vary along the ± tangential directions from the center $C_0$ of the photodetector 30. Thus, the photodetector 30 is arrayed in 2×4 matrix, which comprises 8 sectional plates A1, A2, B1, B2, C1, C2, D1 and D2 that independently perform photoelectric conversion. The outer sectional plates A1, B1, C1 and D1 and the inner sectional plates A2, B2, C2 and D2 are arranged counterclockwise.

Figure 2:
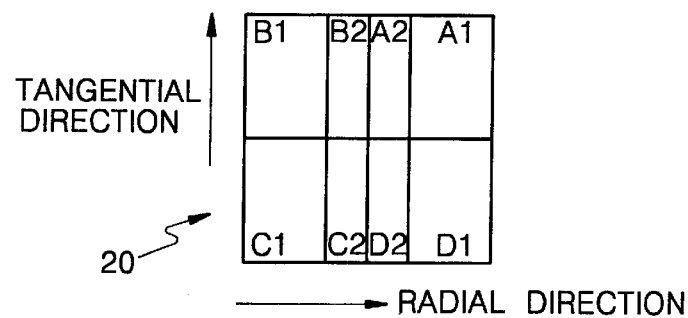
FIGS. 2 and 3 illustrate a tracking error signal detecting apparatus using a conventional 8-sectional photodetector.

As shown in FIG. 2, the light reflected/diffracted from a ROM-type high-density recording medium having relatively narrow tracks is diffracted into 0th-order maximum and ±1st-order maxima along the radial direction. When the 0th-order maximum and the ±1st-order maxima overlap and +1st-order maximum and −1st-order maximum do not overlap, the outer sectional plates A1, B1, C1 and D1 receive light mainly from the overlapping area of the 0th-order maximum and the +1st-order maximum and from the overlapping area of the 0th-order maximum and the −1st-order maximum, and the inner sectional plates A2, B2, C2 and D2 receive light only from the area of the 0th-order maximum.

In other words, the inner sectional plates A2, B2, C2 and D2 are preferably formed such that the widths thereof are relatively narrow at the center $C_0$ of the photodetector 30 and become wider along the ± tangential directions.

However, when using a low-density recording medium having a relatively large track pitch, or RAM-type high-density recording medium having a land/groove configuration in which some of ±1st-order maxima reflected/diffracted from the recording medium simultaneously overlap with 0th-order maximum, the respective light receiving regions 30a, 30b, 30c and 30d are preferably bisected to have inner sectional plates A2, B2, C2 and D2, the widths of which are relatively wide at the center $C_0$ of the photodetector 30 and become narrower along the ± tangential directions. In this case, the inner sectional plates A2, B2, C2 and D2 receive the light from an area where the 0th-order maximum and the ±1st-order maxima overlap simultaneously.

Figure 5:
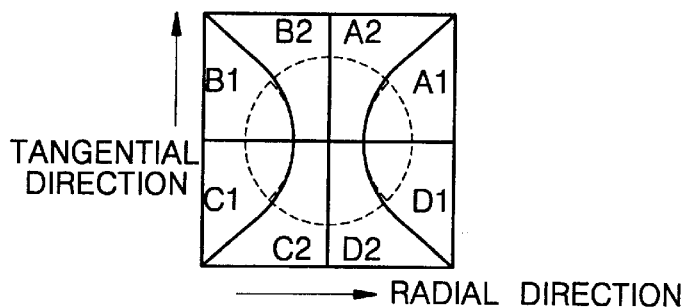
FIGS. 5 through 8 are plan views schematically illustrating alternative photodetectors for use in the tracking error signal detecting apparatus shown in FIG. 4.

The sectioning structure of the 8-sectional photodetector 30 according to the present invention will now be described in greater detail. As shown in FIGS. 4 and 5, a dividing line 35 between the respective light receiving regions 30a, 30b, 30c and 30d is preferably a curved line, where the curvature is calculated so as to separately receive light from an area of the 0th-order maximum and an overlapping area of the 0th-order maximum and the ±1st-order maxima.

As shown, the dividing line 35 is tangent to the overlapping area of the 0th-order maximum and the ±1st-order maxima at the intersection with a row-directional dividing line 31.

As shown in FIG. 4, the dividing line 35 is substantially elliptical, whereas FIG. 5 shows the dividing line 35 as substantially parabolic such that the maximum width of each of the inner sectional plates A2, B2, C2 and D2 is greater than the radius of the 0th-order maximum received thereat.

The dividing line 35 shown in FIG. 5 more closely fits the boundary of the overlapping area of the 0th-order maximum and the ±1st-order maxima and thus has an advantage in that it can minimize the amount of 0th-order maximum received at the outer sectional plates A1, B1, C1 and D1. It is understood, but not shown, that other rounded and circular shapes may be used.

Figure 6:
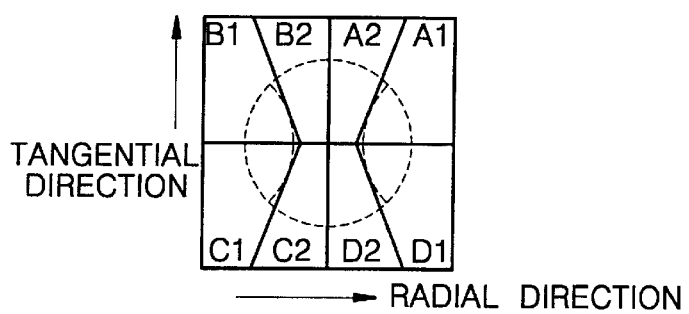
Figure 7:
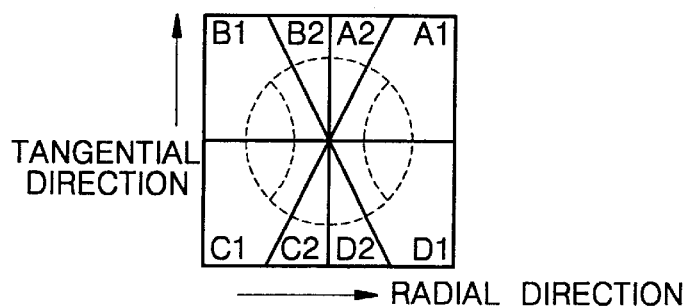
Figure 8:
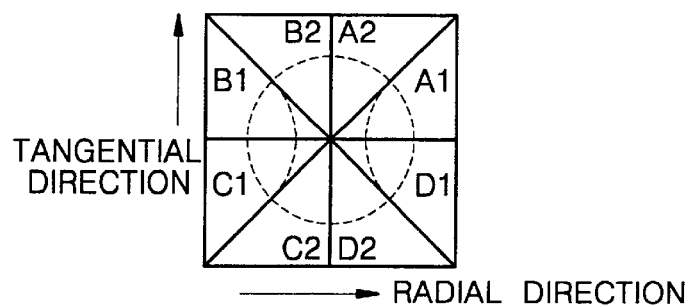

Alternatively, the respective light receiving regions 30a, 30b, 30c and 30d may be bisected such that the width of each of the inner sectional plates A2, B2, C2 and D2 linearly increases from the center $C_0$ of the photodetector 30 outward in the ± tangential directions. As shown in FIGS. 6–8, the respective light receiving regions 30a, 30b, 30c and 30d may be bisected such that each of the inner sectional plates A2, B2, C2 and D2 has the shape of a trapezoid, a right triangle or an isosceles triangle, as viewed at positions spaced a predetermined distance apart from the center $C_0$ of the photodetector 30 outward in the ± tangential directions, as shown in FIGS. 6 through 8.

The tracking error signal detecting apparatus according to an embodiment of the present invention uses the 8-sectional photodetector 30 having various sectioning configurations as described above. The photodetector 30 having the sectioning configuration shown in FIG. 4 will be described below by way of example.

Referring back to FIG. 4, the circuit unit 50 compares the phases of detection signals of inner and/or outer sectional plates positioned in the same row with each other, and detects a tracking error signal from the phase difference signals. The circuit unit 50 includes a pair of phase comparators 51 and 53 for comparing the phases of the input signals, and an adder 59 for adding the phase difference signals output from the phase comparators 51 and 53. Detection signals a1 and b1, which are from the outer sectional plates A1 and B1 positioned in the first row, are input to the phase comparator 51 for phase comparison. Detection signals c1 and d1, which are from the outer sectional plates C1 and D1 positioned in the second row, are input to the phase comparator 53 for phase comparison. The adder 59 adds the phase difference signal between the detection signals a1 and b1 and a phase difference signal between the detection signals c1 and d1, and outputs the tracking error signal (TES).

Figure 3:
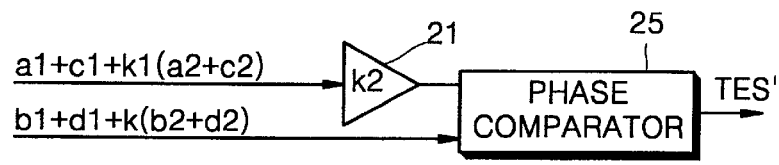
Figure 9:
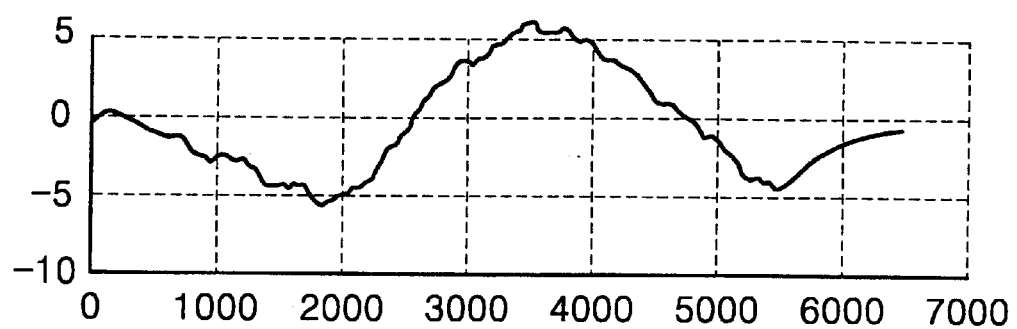
FIG. 9 is a graph showing tracking error signals output from the tracking error signal detecting apparatus shown in FIG. 4.
Figure 10:
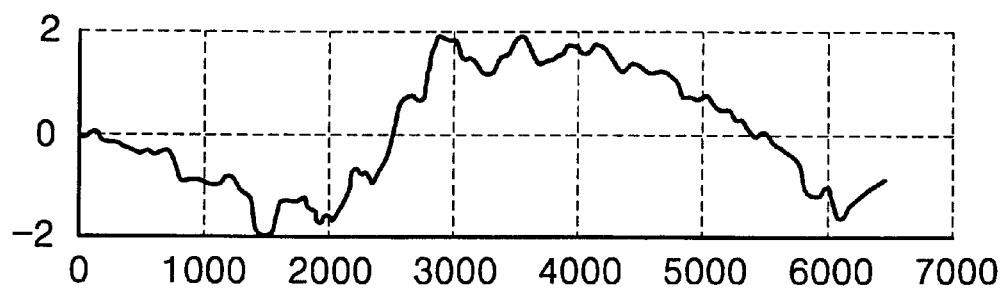
FIG. 10 is a graph showing tracking error signals output from the conventional tracking error signal detecting apparatus.

FIG. 9 is a graph showing a TES detected from the circuit unit 50 of the tracking error signal detecting apparatus shown in FIG. 4. FIG. 10 is a graph showing a TES generated by the conventional tracking error signal detecting apparatus shown in FIGS. 2 and 3. In these graphs, the abscissa indicates a light spot moving across tracks of a recording medium in a radial direction, and the ordinate indicates a change in the tracking error signal depending on the movement of the light spot. Comparing FIGS. 9 and 10, the TES detected by the tracking error signal detecting apparatus according to the present invention has a large gain and noticeably improved noise characteristics over conventional tracking error signal TES' detecting apparatuses.

Figure 11:
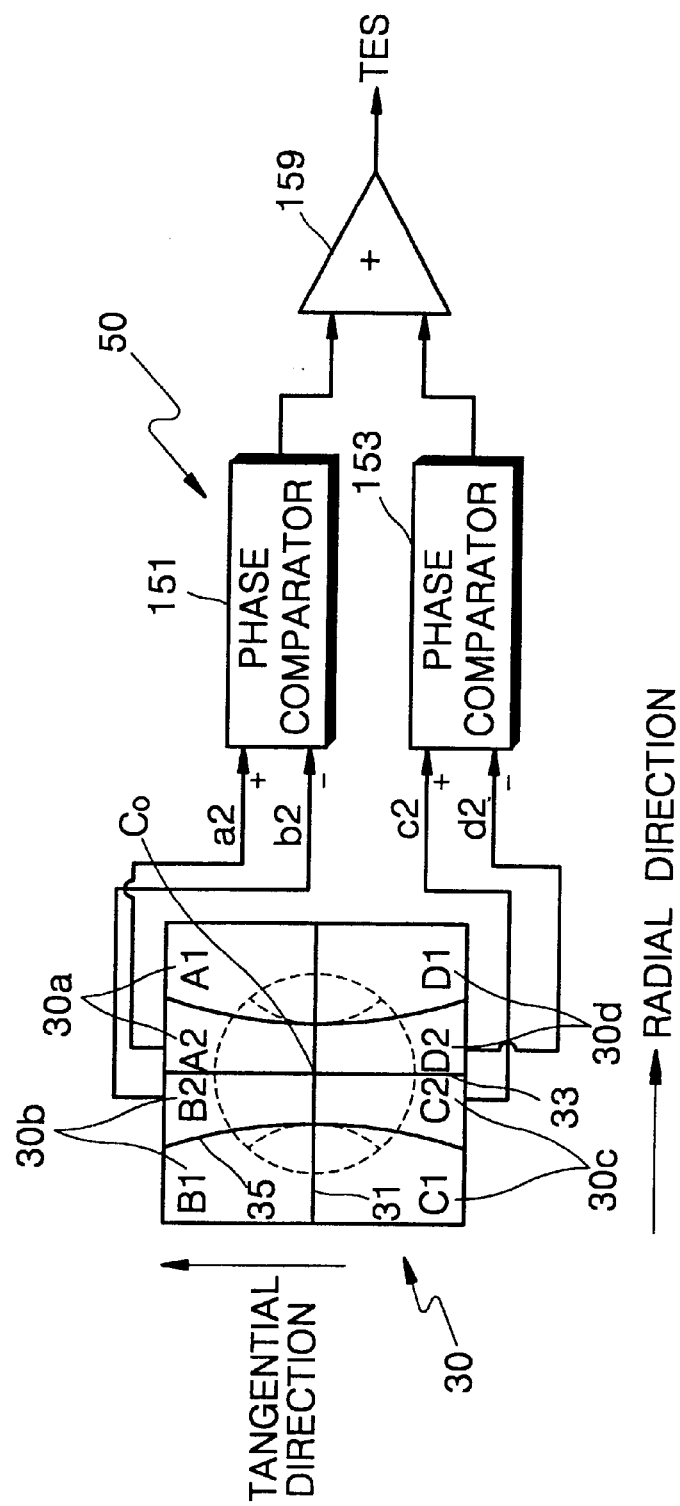
FIGS. 11 through 13 are block diagrams illustrating other embodiments of the circuit unit used in the tracking error signal detecting apparatus shown in FIG. 4.

In another embodiment of the present invention, FIG. 11 shows the circuit 50 where the tracking error signal is generated using the detection signals a2, b2, c2 and d2 of the inner sectional plates A2, B2, C2 and D2, instead of the detection signals a1, b1, c1 and d1 of the outer sectional plates A1, B1, C1 and D1. In other words, the detection signals a2 and b2, which are from the inner sectional plates A2 and B2 positioned in the first row, are applied to the phase comparator 151 and a phase difference signal is output therefrom. The detection signals c2 and d2, which are from the inner sectional plates C2 and D2 positioned in the second row, are applied to the phase comparator 153 and a phase difference signal is output therefrom. The adder 159 adds the phase difference signals and outputs a tracking error signal.

Figure 12:
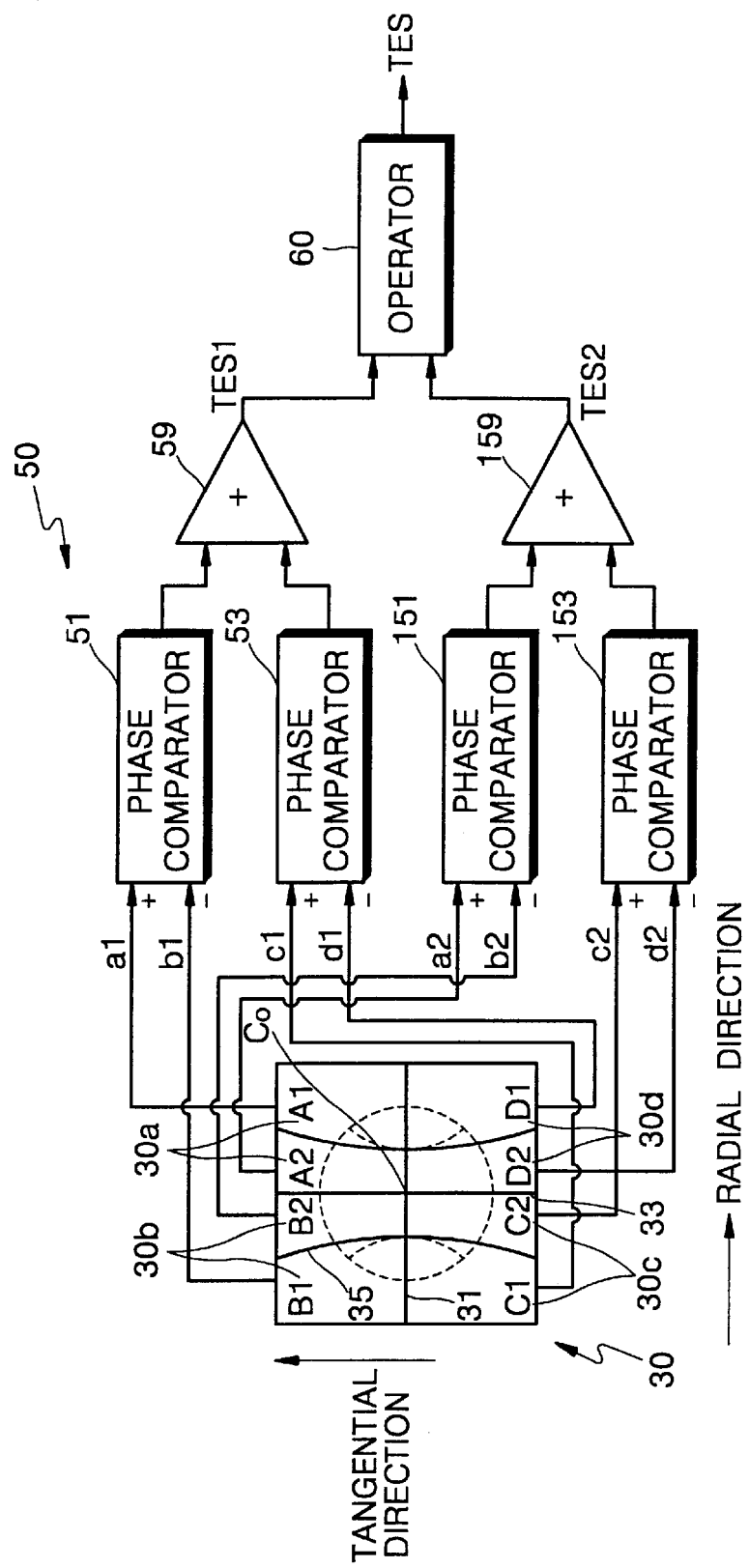

In still another embodiment of the present invention, the circuit unit 50 shown in FIG. 12 combines the embodiments shown in FIGS. 4 and 11 to use detection signals a1, a2, b1, b2, c1, c2, d1 and d2 of all inner and outer sectional plates A1, A2, B1, B2, C1, C2, D1 and D2. A tracking error signal TES1, which is obtained by operation of the detection signals a1, b1, c1 and d1 of the outer sectional plates A1, B1, C1 and D1, and a tracking error signal TES2, which is obtained by operation of the detection signals a2, b2, c2 and d2 of the inner sectional plates A2, B2, C2 and D2, are summed by an operator 60 to produce a tracking error signal TES. In essence, TES1 is a tracking error signal obtained by operation of the detection signals a1, b1, c1 and d1 of the outer sectional plates A1, B1, C1 and D1, and corresponds to a tracking error signal output from the adder 59 shown in FIG. 4; and TES2 is a tracking error signal obtained by operation of the detection signals a2, b2, c2 and d2 of the inner sectional plates A2, B2, C2 and D2, and corresponds to a tracking error signal output from the adder 159 shown in FIG. 11.

The operator 60 amplifies TES2 output from the adder 159 with a predetermined gain k, and then sums it with the other tracking error signal TES1 to produce a tracking error signal TES (TES=TES1+(k*TES2).

In another embodiment of the present invention, the operator 60 may also amplify the tracking error signal TES1 with a predetermined gain, whereby the operator 60 amplifies both the tracking error signal TES1 and TES2 with appropriate gains, and then sums the amplified signals and produces the tracking error signal TES.

Figure 13:
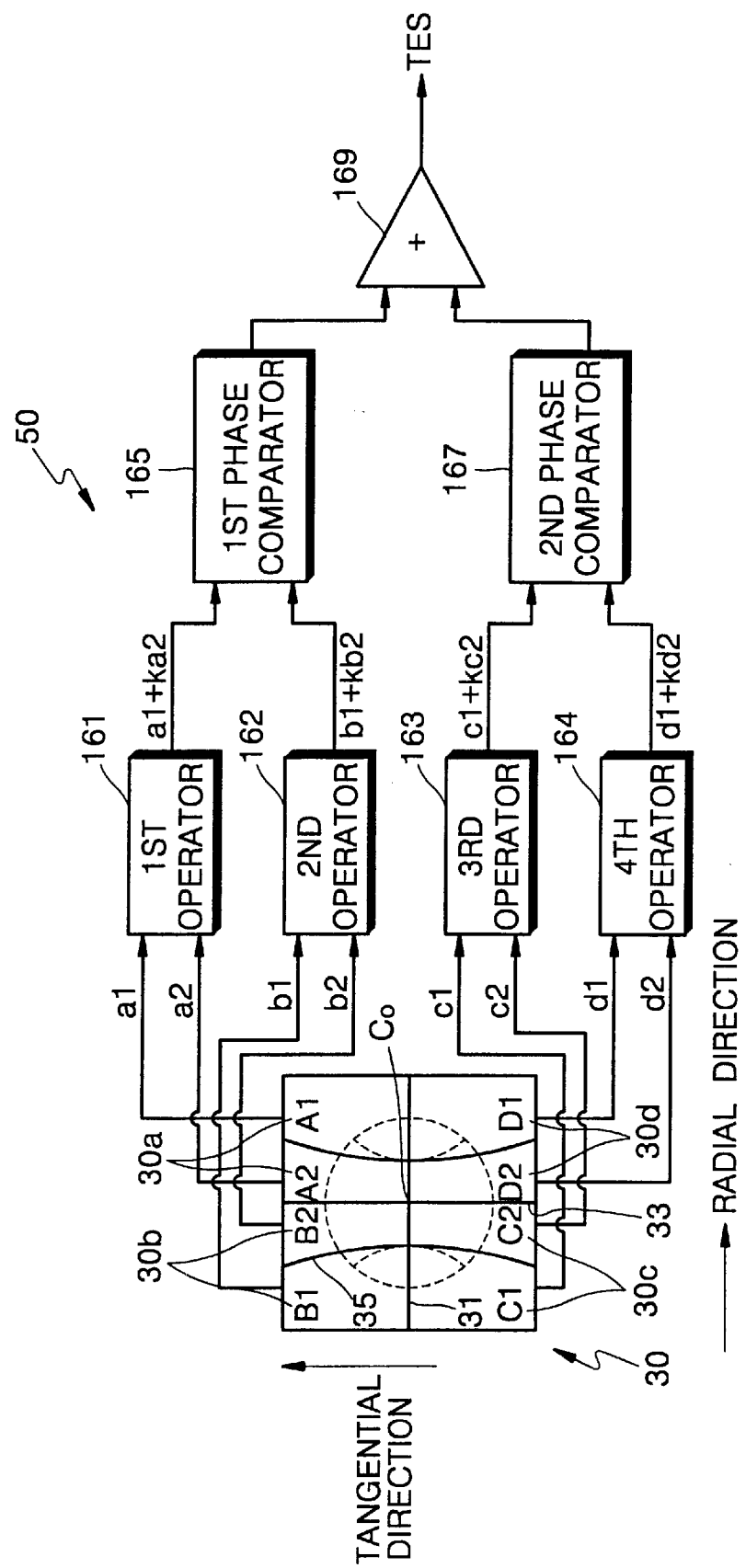

According to a further embodiment of the present invention, the circuit unit 50 shown in FIG. 13 includes first through fourth operators 161, 162, 163 and 164, first and second phase comparators 165 and 167, and an adder 169. Circuit 50 produces a tracking error signal by phase-comparing sum signals a1+ka2, b1+kb2, c1+kc2 and d1+kd2 of signals ka2, kb2, kc2 and kd2 obtained by amplifying detection signals a2, b2, c2 and d2 of the inner sectional plates A2, B2, C2 and D2 with a predetermined gain k, and detection signals a1, b1, c1 and d1 of the corresponding outer sectional plates A1, B1, C1 and D1, and adding the phase difference signals.

The detection signals a1 and a2, which are from the outer and inner sectional plates A1 and A2 forming the light receiving regions 30a positioned in the first row, are applied to the first operator 161. The first operator 161 amplifies the detection signal a2 of the inner sectional plate A2 with a predetermined gain k, and then sums the result with the detection signal a1 of the outer sectional plate A1. Thus, the output signal of the first operator 161 becomes a1+ka2.

Likewise, the detection signals b1 and b2, c1 and c2, and d1 and d2 of the other light receiving regions 30b, 30c, 30d are applied to the second through fourth operators 162, 163 and 164 to then be operated. The second through fourth operators 162, 163 and 164 output operation signals b1+kb2, c1+kc2 and d1+kd2.

Signals detected from the light receiving plates A1 and A2, and B1 and B2 positioned in the first row and, having passed through the first and second operators 161 and 162, are phase-compared by the first phase comparator 165. Likewise, the signals detected from the light receiving plates C1 and C2, and D1 and D2 positioned in the second row and, having passed through the third and fourth operators 163 and 164, are phase-compared by the second phase comparator 167. The phase difference signals output from the first and second phase comparators 165 and 167 are summed by the adder 169, which outputs the tracking error signal TES.

The circuit unit 50 having the aforementioned configuration sums detections signals of outer and inner sectional plates forming the respective light receiving regions 30a, 30b, 30c and 30d with signals obtained by amplifying the detection signals of the inner sectional plates with a predetermined gain, and compares the phase differences of the signals from the sectional plates positioned in the same row. Thus, a difference in the signal characteristic between the detection signals of the outer and inner sectional plates can be compensated for, thereby detecting a tracking error signal with a large gain, and reducing crosstalk noise.

Figure 14:
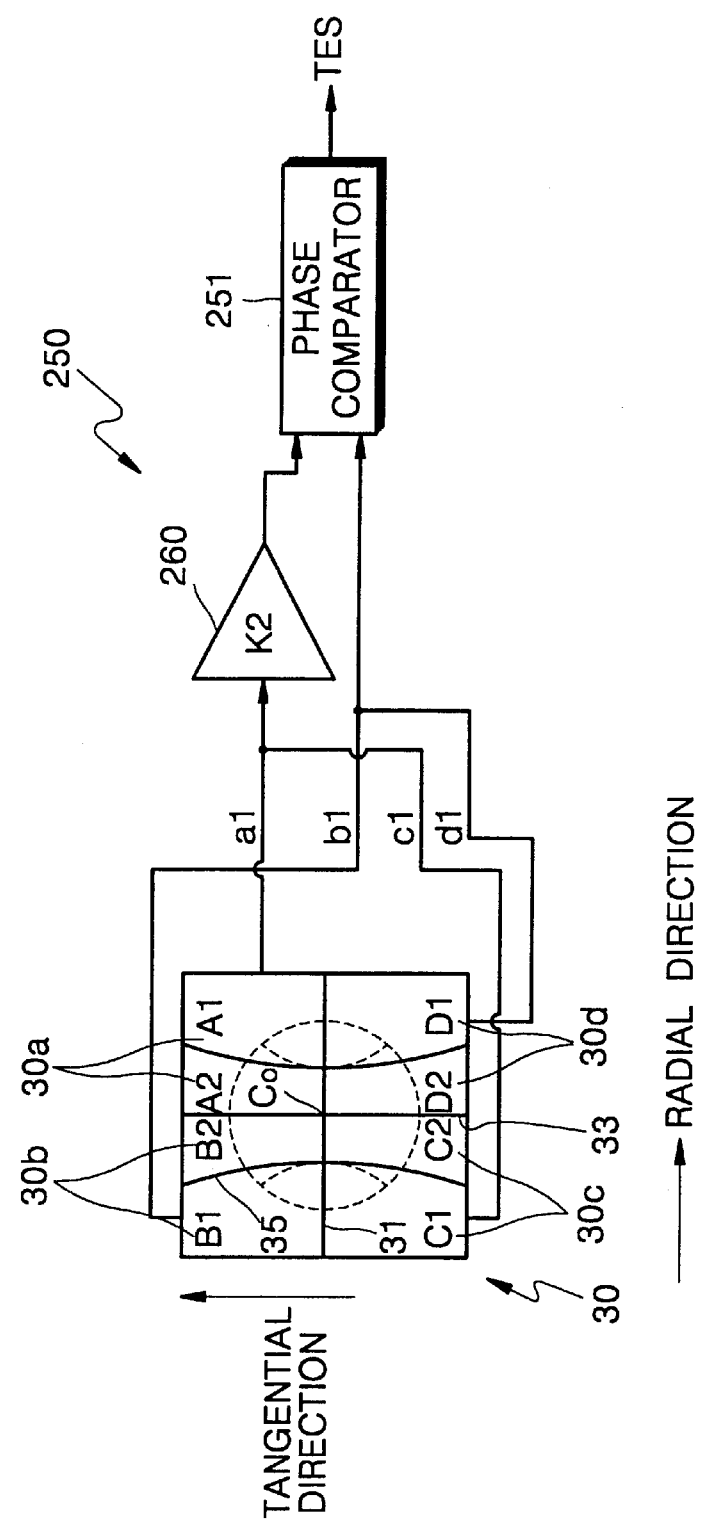
FIG. 14 is a diagram schematically illustrating a tracking error signal detecting apparatus according to another embodiment of the present invention.

FIG. 14 illustrates a tracking error signal detecting apparatus according to another embodiment of the present invention, in which a circuit unit 250 detects a tracking error signal from phase difference signals by amplifying at least some of the detection signals of the inner and/or outer sectional plates positioned in one diagonal direction with a predetermined gain and phase-comparing the amplified signals with at least some of the detection signals of inner and/or outer sectional plates positioned in the other diagonal direction. The circuit unit 250 includes an amplifier 260, which amplifies a sum signal (a1+c1) of the detection signals a1 and c1 from the outer sectional plates A1 and C1 by gain k2. A phase comparator 251 compares the phases of a sum signal (b1+d1) of the detection signals b1 and d1 from the outer sectional plates B1 and D1, which are positioned in the other diagonal direction, and an output signal k2(a1+c1) from the amplifier 260 to detect a tracking error signal TES. As shown, the gain k2 is a constant other than zero.

The aforementioned tracking error signal detecting apparatus sums the detection signals of outer sectional plates positioned in a diagonal direction like in the general DPD method. However, the apparatus receives only the light of overlapping areas of the 0th-order maximum and +1st-order maximum and the 0th-order maximum and −1st-order maximum from outer sectional plates, amplifies the sum signal of one diagonal direction with a predetermined gain and then compares the phase of the amplified signal with that of the sum signal of the other diagonal direction. Thus, the tracking error signal TES has a larger gain and less noise than the tracking error signal TES from a conventional device such as that shown in FIG. 2.

In an alternative embodiment, the circuit unit 250 of FIG. 14 may also be configured to detect a tracking error signal using the detection signals from the inner sectional plates A2, B2, C2 and D2.

Figure 15:
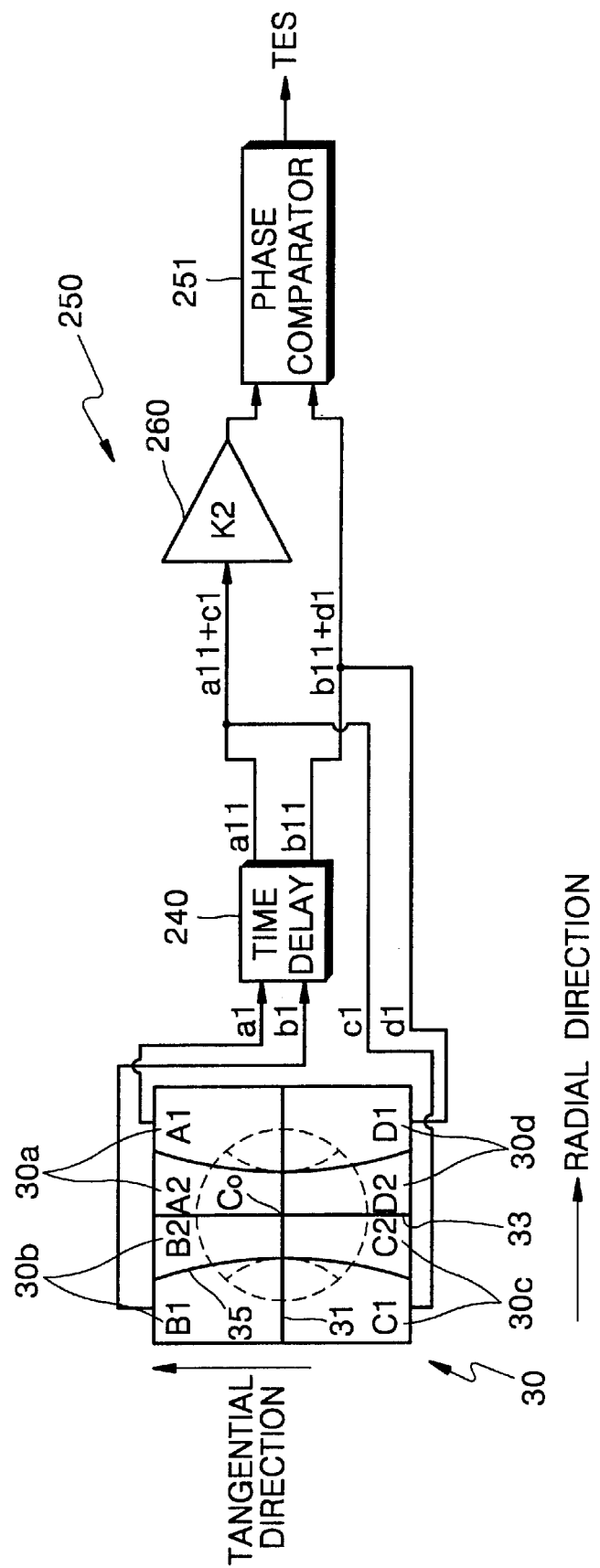
FIGS. 15 through 17 are block diagrams illustrating alternative circuit units for use in the tracking error signal detecting apparatus shown in FIG. 14.

In another embodiment of the present invention shown in FIG. 15, the circuit unit 250 of FIG. 14 may further include a time delay 240 at output ends of the outer sectional plates A1 and B1. The detection signals a1 and b1 of the outer sectional plates A1 and B1 pass through the time delay 240, and become time-delayed signals a11 and b11. The time-delayed signals a11 and b11 are summed with the detection signals c1 and d1 of the outer sectional plates C1 and D1 positioned in another row, and are then be applied to the amplifier 260 and the phase comparator 251.

If the detection signals a1 and b1 of the outer sectional plates A1 and B1 positioned in one row are time-delayed to detect a tracking error signal TES, as shown in FIG. 15, it is possible to compensate for a tracking error signal offset generated when an objective lens (not shown) is shifted due to a phase difference offset of diagonal sum signals. This effect is caused by a change in the pit depth, occurring to actual recording media, thereby detecting a more accurate tracking error signal. Basically, if a difference in the pit depth of a recording medium is generated, the conventional tracking error signal detecting apparatus detects a tracking error signal by summing detection signals of two diagonal directions and then subtracting the diagonal sum signals. Thus, the signal deterioration is severe.

However, the circuit unit 250 of FIG. 15 first performs an operation on the detection signals from sectional plates positioned in the same diagonal line, and time-delays and amplifies these signals to produce a tracking error signal. Thus, since the phase deterioration due to the signal distortion caused by a change in the pit depth is greatly improved, a tracking error signal with greatly reduced offset can be generated.

Figure 16:
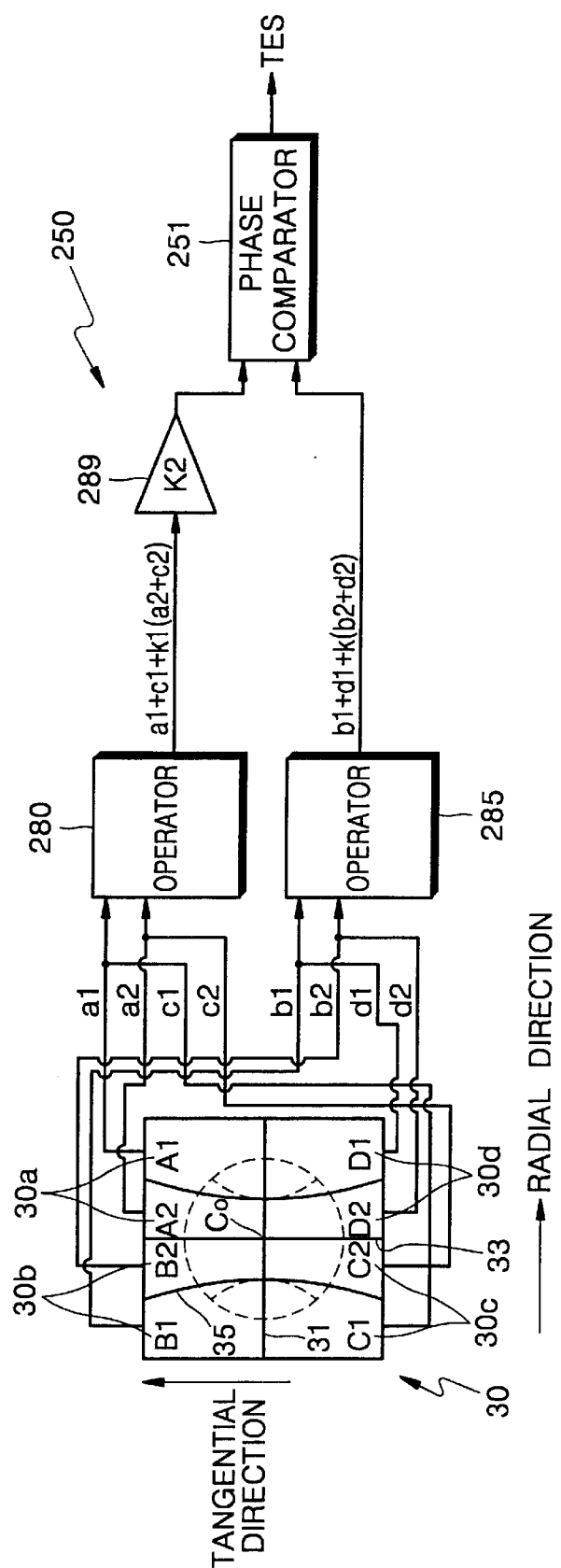

In another embodiment of the present invention shown in FIG. 16, the circuit unit 250, generates a tracking error signal using the detection signals of both the inner and outer sectional plates A2, B2, C2 and D2 and A1, B1, C1 and D1. In other words, the circuit unit 250 may detect a tracking error signal by appropriately operating the detection signals from sectional plates positioned in the respective diagonal directions, and phase-comparing the operation signals. Detection signals a1, c1, a2 and c2, which are from the outer and inner sectional plates A1, C1, A2, C2 positioned in one diagonal direction, are applied to a first operator 280. The first operator 280 amplifies a sum signal (a2+c2) with a predetermined gain k1, and adds a sum signal (a1+c1) with the amplified sum signal k1(a2+c2). The output signal a1+c1+k1(a2+c2) of the first operator 280 is again amplified by an amplifier 289 with a predetermined gain k2. Detection signals b1, d1, b2 and d2, which are from the outer and inner sectional plates B1, D1, B2, D2 positioned in the other diagonal direction, are applied to a second operator 285. The second operator 285 amplifies a sum signal (b2+d2) with a predetermined gain k, and adds a sum signal (b1+d1) with the amplified sum signal k(b2+d2). The output signal of the amplifier 289 and the output signal b1+d1+k(b2+d2) are applied to a phase comparator 251 to be phase-compared. The phase comparator 251 outputs a tracking error signal TES.

The gains k and k1 are constants, and the gain k2 is preferably a constant other than zero. In addition, the sum k+k1 is preferably a constant. If the gains k and k1 are both zero, the same result as found in the device shown in FIG. 14 occurs.

Figure 17:
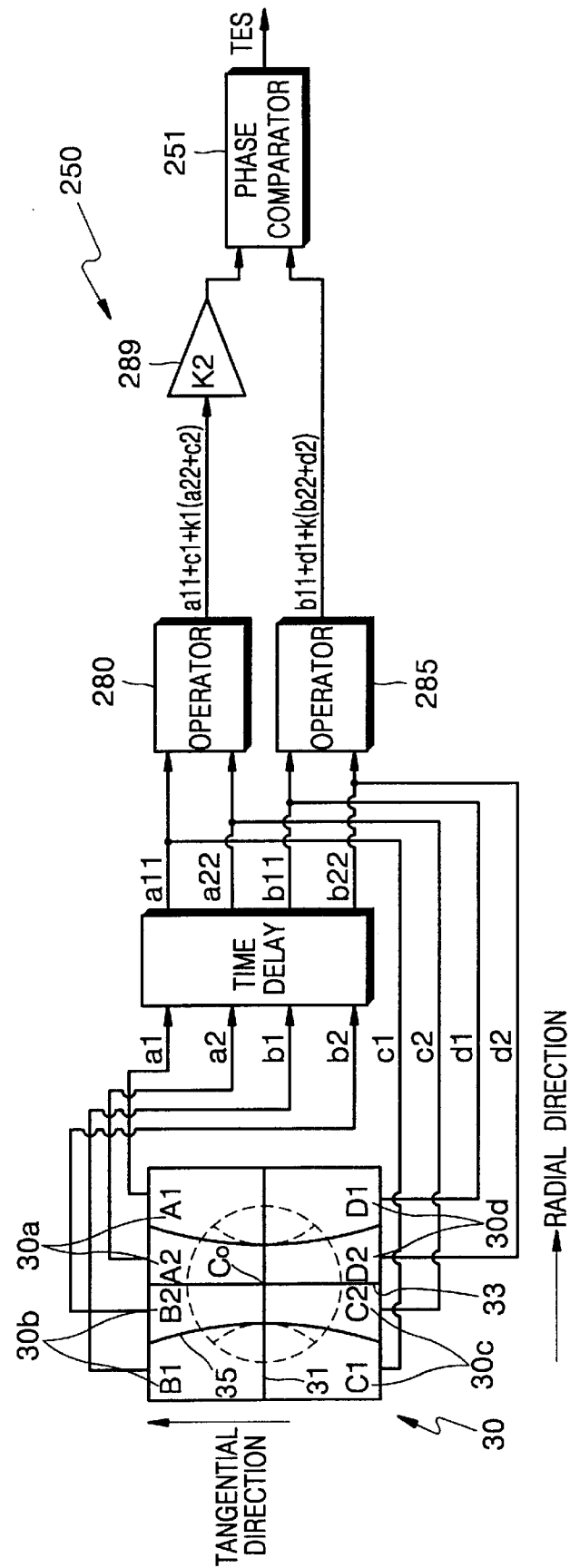

In another embodiment of the present invention shown in FIG. 17, the circuit unit 250 shown in FIG. 16 may further include a time delay 240 at the output ends of the sectional plates A1, A2, B1 and B2. In this case, the detection signals a1, a2, b1 and b2 pass through the time delay 240 to produce time-delayed signals a11, a22, b11 and b22, respectively. The time-delayed signals a11 and a22 and the detection signals c1 and c2, which are from the sectional plates C1 and C2, and the time-delayed signals b11 and b22 and the detection signals d1 and d2, which are from the sectional plates D1 and D2 are applied to the first and second operators 280 and 285, respectively. The output signal a11+c1+k1(a22+c2) of the first operator 280 is amplified by the amplifier 289 with a predetermined gain k2. The output signal b11+d1+k(b22+d2) of the second operator 285 and the output signal k2 (a11+c1+k1(a22+c2)) of the amplifier 289 are applied to the phase comparator 251 to then be phase-compared. The phase comparator 251 outputs a tracking error signal TES.

As in FIG. 15, the circuit unit 250 reduces signal distortion by the time delay and amplification even when there is a difference between pit depths of a recording medium. Thus, even in the case of a lens shift, a tracking error signal with greatly reduced offset can be generated.

It is preferable that when the light spot deviates 0.1 μm from the center of the pit or mark sequence recorded on the recording medium, the tracking error signals detected by the embodiments of the above-described tracking error signal detecting apparatus preferably have approximately 0.5 in the minimum value of $\Delta t/Tw$, where Tw represents a period of a channel clock of the recording/reproducing apparatus, and $\Delta t$ represents the detected average phase difference time. Preferably, the maximum value of $|(T1-T2)/(T1+T2)|$ is 0.2, where T1 represents the maximum value of the tracking error signal, which is a positive value, and T2 represent the minimum value of the tracking error signal, which is a negative value.

Also, in the embodiments of the above-described tracking error signal detecting apparatus, phase comparators are provided for phase-comparing input signals through selectively blocking or amplifying the input signals according to the frequency band, digitization, phase-comparison of digitized signals and integration of the phase-compared signals, and outputting tracking error signals.

Figure 18:
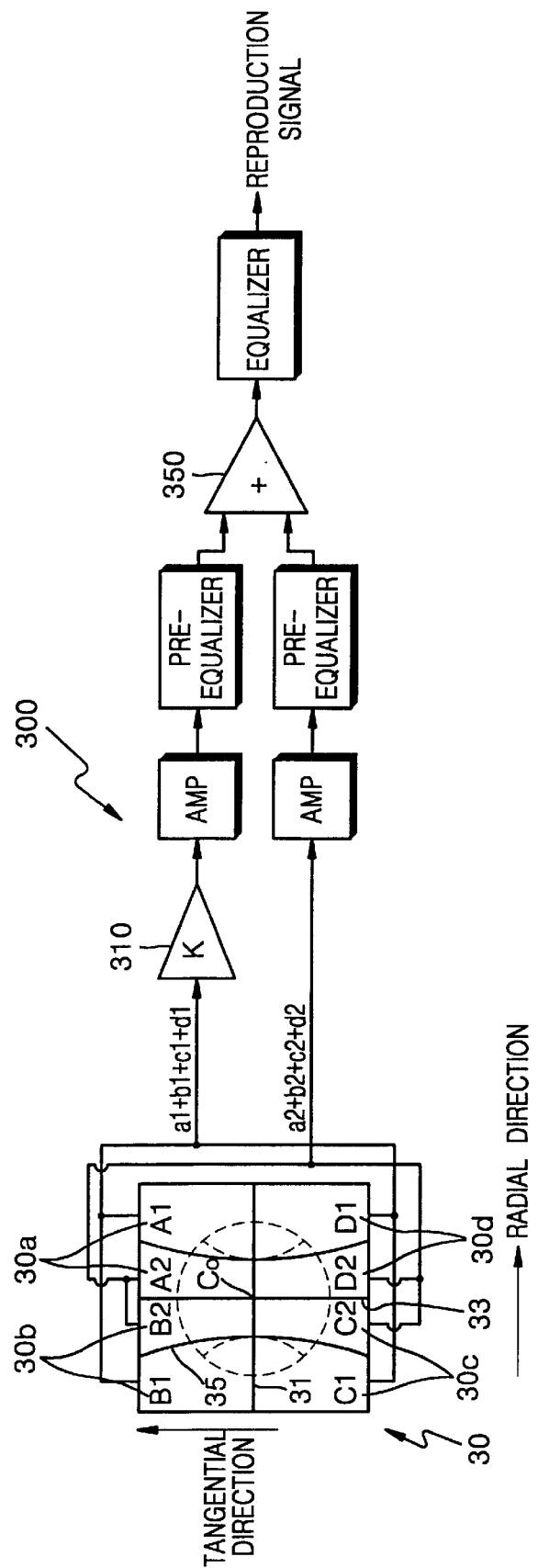
FIG. 18 is a diagram schematically illustrating a reproduction signal detecting apparatus according to an embodiment of the present invention.

FIG. 18 is a diagram schematically illustrating a reproduction signal detecting apparatus according to another embodiment of the present invention. The reproduction signal detecting apparatus includes an 8-sectional photodetector 30 and a circuit unit 300 for reproducing information of a recording medium from detection signals of the photodetector 30. The photodetector 30 may be one of the 8-sectional photodetectors shown in FIGS. 4 through 8.

The circuit unit 300 for detecting a reproduction signal includes an amplifier 310 for amplifying a sum signal (a1+b1+c1+d1), which is the sum of the detection signals a1, b1, c1 and d1 from outer sectional plates A1, B1, C1 and D1, with a predetermined gain k. An adder 350 adds a sum signal (a2+b2+c2+d2), which is a sum of the detection signals a2, b2, c2 and d2 from the inner sectional plates A2, B2, C2 and D2, and an output signal of the amplifier 310. The adder 350 outputs a reproduction signal.

The gain k is a value which is calculated to maximize the magnitude of the reproduction signal and minimize the jitter and error ratio of the reproduction signal.

Circuit unit 300 includes amplifiers AMPs 320 for uniformly amplifying signals and pre-equalizers 330 for correcting phase distortion of signals. AMPs 300 and pre-equalizers 330 are located between the amplifier 310 and the adder 350 and along the transmission path of the sum signal a2+b2+c2+d2. In addition, the circuit unit 300 uses an equalizer 340 at the output end of the adder 350.

The reproduction signal detecting apparatus according to an embodiment of the present invention amplifies the sum signal a1+b1+c1+d1, which is the sum of detection signals a1, b1, c1 and d1 from outer sectional plates A1, B1, C1 and D1, with a predetermined gain k, and sums the amplified signal with the sum signal a2+b2+c2+d2, which is the sum of detection signals a2, b2, c2 and d2 from inner sectional plates A2, B2, C2 and D2, to thus detect a reproduction signal.

Figure 19:
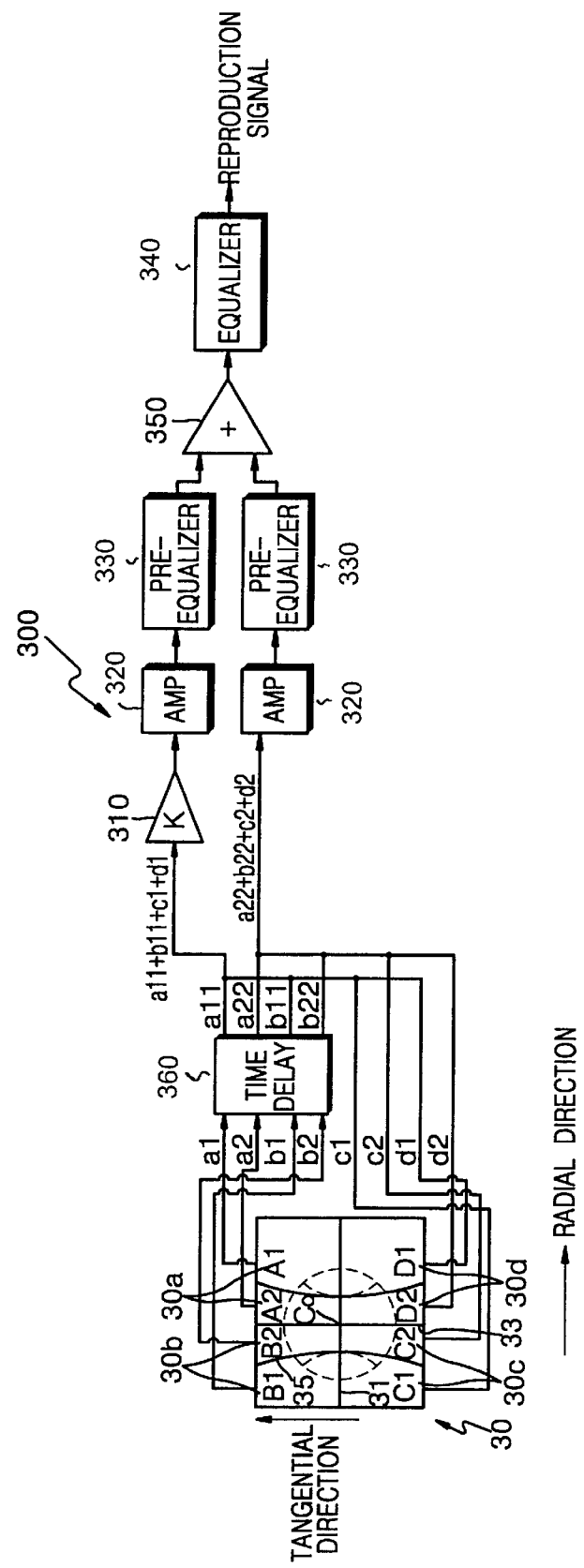
FIG. 19 is a diagram schematically illustrating a reproduction signal detecting apparatus according to another embodiment of the present invention.

FIG. 19 is a diagram schematically illustrating a reproduction signal detecting apparatus according to another embodiment of the present invention. A circuit unit 300 according to this embodiment further includes a time delay 360 for time-delaying the detection signals a1, a2, b1 and b2 from the sectional plates A1, A2, B1 and B2. The reproduction signal detecting apparatus according to this embodiment of the present invention amplifies a sum signal a11+b11+c1+d1, which is the sum of the time-delayed signals a11 and b11 and detection signals c1 and d1 from the outer sectional plates C1 and D1 with, a predetermined gain k. The amplified signal is summed with a sum signal a22+b22+c2+d2, which is the sum of the time-delayed signals a22 and b22 and the detection signals c2 and d2 from the inner sectional plates C2 and D2, to thus detect a reproduction signal.

According to the reproduction signal detecting apparatuses of the present invention described in FIGS. 18 and 19, during reproduction of a high-density recording medium having narrow tracks, it is possible to compensate for a phase difference due to a crosstalk between adjacent tracks of detection signals of inner sectional plates and detection signals of outer sectional plates, thereby detecting a reproduction signal with much less crosstalk than in the conventional reproduction signal detecting apparatus. In particular, during reproduction of a recording medium having a large difference in the pit depths, a crosstalk reducing effect can be enhanced by using the reproduction signal detecting apparatus shown in FIG. 19 configured to phase-delay detection signals of some sectional plates.

As described above, the tracking error signal detecting apparatus according to the present invention includes an 8-sectional photodetector the widths of which vary in a radial direction of the respective sectional plates so as to make full use of the phase characteristics depending on light receiving regions. The detections signals of the inner and outer sectional plates are operated in consideration of a difference in the phase characteristics. Therefore, a tracking error signal with a large gain and greatly reduced crosstalk between adjacent tracks can be detected. Also, a phase deterioration due to signal distortion caused by a difference in pit depths can be greatly reduced by using time-delayed signals of the detection signals of some sectional plates. Thus, even when a lens shift occurs, a tracking error signal having little offset can be generated.

In addition, the tracking error signal detecting apparatus according to the present invention has accurate tracking control in a high-density recording medium having relatively narrow tracks.

Also, the reproduction signal detecting apparatus according to the present invention can correct signal distortion due to a difference between phase characteristics of detection signals of inner and outer sectional plates of a photodetector even during reproduction of an information signal from a high-density recording medium having relatively narrow tracks, thereby detecting an improved reproduction signal with greatly reduced crosstalk.

Although the present invention has been described and illustrated in detail through specific embodiments, it is clearly understood that various modifications and changes may be effected within the scope of the invention.

What is claimed is:

1. A tracking error signal detecting apparatus that detects a tracking error signal from light reflected/deflected from a recording medium having radial and tangential directions, comprising:

a photodetector to receive the light reflected/diffracted from the recording medium and produce detection signals, said photodetector comprising
four light receiving regions arrayed counterclockwise that are divided by first dividing lines that are substantially parallel to radial and tangential directions of the recording medium, and
each of the four light receiving regions comprises
an inner sectional plate, and
an outer sectional plate,
wherein the inner and outer sectional plates are bisected by second dividing lines such that respective radial widths vary along ± tangential directions from a center of said photodetector,
wherein the eight inner and outer sectional plates are arrayed in a 2×4 matrix with the directions of columns and rows of the inner and outer sectional plates corresponding to the radial and tangential directions of the recording medium; and a circuit unit to
compare phases of the detection signals from the light receiving regions in the same row to produce a phase difference signal, and
produce the tracking error signal from the phase difference signal.

2. The tracking error detecting apparatus according to claim 1, wherein said circuit unit comprises:

a first phase comparator that compares phases of the detection signals of a pair of the outer sectional plates positioned in one of the rows, and outputs a first phase difference signal;

a second phase comparator that compares phases of the detection signals of a pair of the outer sectional plates positioned in the other one of the rows, and outputs a second phase difference signal; and an adder that adds the first and second phase difference signals, and outputs the tracking error signal.

3. The tracking error detecting apparatus according to claim 1, wherein said circuit unit comprises:

a first phase comparator that compares phases of the detection signals of a pair of the inner sectional plates positioned in one of the rows, and outputs a first phase difference signal;

a second phase comparator that compares phases of the detection signals of a pair of the inner sectional plates positioned in the other one of the rows, and outputs a second phase difference signal; and an adder that adds the first and second phase difference signals, and outputs the tracking error signal.

4. The tracking error detecting apparatus according to claim 1, wherein said circuit unit comprises:

first and second phase comparators that compare phases of the detection signals of respective pairs of the inner and outer sectional plates that are positioned in one of the rows, respectively, and output phase difference signals;

third and fourth phase comparators that compare phases of the detection signals of respective pairs of the inner and outer sectional plates that are positioned in the other one of the rows, and output phase difference signals;

a first adder that adds the phase difference signals output from the first and third phase comparators to detect a first tracking error signal based on the detection signals of the outer sectional plates;

a second adder that adds the phase difference signals output from the second and fourth phase comparators to detect a second tracking error signal based on the detection signals of the inner sectional plates; and an operator that sums the first and second tracking error signals to output the tracking error signal.

5. The tracking error signal detecting apparatus according to claim 4, wherein the operator amplifies at least one of the first and second tracking error signals output from the first and second adders with a predetermined gain to produce the tracking error signal.

6. The tracking error detecting apparatus according to claim 1, wherein said circuit unit comprises:
   a first operator that amplifies the detection signal of one of the inner sectional plates positioned in one of the rows with a predetermined gain, and adds the amplified signal and the detection signal of the corresponding outer sectional plate to output a first sum signal;
   a second operator that amplifies the detection signal of the other one of the inner sectional plates positioned in the one row with a predetermined gain, and adds the amplified signal and the detection signal of the corresponding outer sectional plate to output a second sum signal;
   a third operator that amplifies the detection signal of one of the inner sectional plates positioned in the other one of the rows with a predetermined gain, and adds the amplified signal and the detection signal of the corresponding outer sectional plate to output a third sum signal;
   a fourth operator that amplifies the detection signal of the other inner sectional plate positioned in the other row with a predetermined gain, and adds the amplified signal and the detection signal of the corresponding outer sectional plate to output a fourth sum signal;
   a first phase comparator that compares phases of the first and second sum signals output from the first and second operators, and outputs a first phase difference signal;
   a second phase comparator that compares phases of the third and fourth sum signals output from the third and fourth operators, and outputs a second phase difference signal; and
   an adder that adds the first and second phase difference signals, and outputs the tracking error signal.

7. The tracking error detecting apparatus according to claim 1, wherein respective widths of the inner sectional plates are narrower at a center of said photodetector, and wider along the ± tangential directions.

8. The tracking error detecting apparatus according to claim 7, wherein the second dividing lines that divide the inner light receiving regions from the outer sectional plates are curved.

9. The tracking error detecting apparatus according to claim 8, wherein a maximum width of each of the inner sectional plates is greater than a radius of received 0th-order maximum.

10. The tracking error detecting apparatus according to claim 7, wherein the width of each of the inner sectional plates linearly increases from the center of the photodetector outward in the ± tangential directions.

11. The tracking error detecting apparatus according to claim 10, wherein each of the inner sectional plates comprise a shape selected from a trapezoid, a right triangle, and an isosceles triangle.

12. A tracking error signal detecting apparatus that detects a tracking error signal from light reflected/deflected from a recording medium having radial and tangential directions, comprising:
   a photodetector to receive the light reflected/diffracted from the recording medium and produce detection signals, said photodetector comprising
      four light receiving regions arrayed counterclockwise that are divided by first dividing lines that are substantially parallel to the radial and tangential directions of the recording medium,
      each of the four light receiving regions comprises
         an inner sectional plate, and
         an outer sectional plate,
            wherein the inner and outer sectional plates are bisected by second dividing lines such that respective radial widths vary along ± tangential directions from a center of said photodetector,
      wherein the eight inner and outer sectional plates are arrayed in a 2×4 matrix such that the directions of columns and rows of the sectional plates correspond to the radial and tangential directions of the recording medium; and
   a circuit unit to
      amplify at least some of the detection signals of the inner and/or outer sectional plates positioned in one diagonal direction with a predetermined gain,
      compare phase differences between the amplified signals and at least some of the detection signals of the inner and/or outer sectional plates positioned in the other diagonal direction to produce a phase difference signal, and
      detect the tracking error signal from the phase difference signal.

13. The tracking error detecting apparatus according to claim 12, wherein said circuit unit comprises:
   an amplifier that amplifies a sum signal of the detection signals of the outer or inner sectional plates positioned in one diagonal direction with a predetermined gain; and
   a phase comparator that compares phases of a sum signal of the detection signals of the outer or inner sectional plates positioned in the other diagonal direction to detect the tracking error signal.

14. The tracking error detecting apparatus according to claim 12, wherein said circuit unit comprises:
   a first operator that
      receives the detection signals of the inner and outer sectional plates positioned in the one diagonal direction,
      amplifies a sum signal of the detection signals of the inner sectional plates with a first predetermined gain, and
      adds the amplified signal and a sum signal of the detection signals of the outer sectional plates;
   a second operator that
      receives the detection signals of the inner and outer sectional plates positioned in the other diagonal direction,
      amplifies a sum signal of detection signals of the inner sectional plates with a second predetermined gain, and
      adds the amplified signal and a sum signal of the detection signals of the outer sectional plates;
   an amplifier that amplifies a signal output from one of the first and second operators with a third predetermined gain; and
   a phase comparator that compares phases of a signal output from the other of the first and second operators and a signal output from the amplifier to produce the tracking error signal.

15. The tracking error detecting apparatus according to claim 14, wherein a sum of the first and second predetermined gains is a constant value.

16. The tracking error detecting apparatus according to claim 13, wherein said circuit unit further comprises a time delay that time-delays the detection signals of the inner and/or outer sectional plates positioned in one of the rows.

17. The tracking error detecting apparatus according to claim 14, wherein said circuit unit further comprises a time delay that time-delays detection signals of the inner and/or outer sectional plates positioned in one of the rows.

18. The tracking error detecting apparatus according to claim 12, wherein respective widths of the inner sectional plates are narrower at a center of said photodetector, and wider along the ± tangential directions.

19. The tracking error detecting apparatus according to claim 18, wherein the second dividing lines that divide the inner light receiving regions from the outer sectional plates are curved.

20. The tracking error detecting apparatus according to claim 19, wherein a maximum width of each of the inner sectional plates is greater than a radius of received 0th-order maximum.

21. The tracking error detecting apparatus according to claim 18, wherein the respective width of each of the inner sectional plates linearly increases from the center of said photodetector outward in the ± tangential directions.

22. The tracking error detecting apparatus according to claim 21, wherein each of the inner sectional plates comprise a shape selected from a trapezoid, a right triangle, and an isosceles triangle.

23. A reproduction signal detecting apparatus that detects a tracking error signal from light reflected/deflected from a recording medium having radial and tangential directions, comprising:

a photodetector that receives the light reflected/diffracted from the recording medium and produces detection signals, said photodetector comprises
four light receiving regions arrayed counterclockwise that are divided by first dividing lines that are substantially parallel to the radial and tangential directions of the recording medium,
each of the four light receiving regions comprise
an inner sectional plate, and
an outer sectional plate,
wherein the inner and outer sectional plates are bisected by second dividing lines such that respective radial widths vary along ± tangential directions from a center of said photodetector,
wherein the eight inner and outer sectional plates are arrayed in a 2×4 matrix with the directions of columns and rows of the sectional plates corresponding to the radial and tangential directions of the recording medium; and a circuit unit that comprises:
an amplifier that amplifies a sum signal of the detection signals of the outer sectional plates, and
an adder that adds a sum signal of the detection signals of the inner sectional plates and the output signal of the amplifier to produce the reproduction signal.

24. The reproduction signal detecting apparatus according to claim 23, wherein said circuit unit further comprises a time delay that time-delays the detection signals of the inner and/or outer sectional plates positioned in one of the rows.

25. The reproduction signal detecting apparatus according to claim 23, wherein the respective width of each of the inner sectional plates linearly increases from the center of said photodetector outward in the ± tangential directions.

26. The reproduction signal detecting apparatus according to claim 24, wherein the respective width of each of the inner sectional plates linearly increases from the center of said photodetector outward in the ± tangential directions.

27. The reproduction signal detecting apparatus according to claim 23, wherein said circuit unit further comprises an equalizer that receives the added signal from said adder and produces the reproduction signal.

28. The reproduction signal detecting apparatus according to claim 23, wherein said circuit unit further comprises:
a second amplifier to receive and amplify the amplified sum signal from the amplifier,
a second equalizer to receive and equalize the signal from the second amplifier and to provide the equalized signal to the adder,
a third amplifier to receive and amplify the detection signals of the inner sectional plates, and
a third equalizer to receive and equalize the signal from the third amplifier and to provide the equalized signal to the adder.

* * * * *